United States Patent [19]
Natsumi et al.

[11] Patent Number: 5,669,290
[45] Date of Patent: Sep. 23, 1997

[54] REVOLVING SPIT-GRILLING APPARATUS

[76] Inventors: Yoshio Natsumi; Hideko Natsumi, both of Taira Akai Hira 3-144, Iwaki-shi, Fukushima-ken, Japan

[21] Appl. No.: 626,089

[22] Filed: Apr. 3, 1996

[30] Foreign Application Priority Data

Apr. 11, 1995 [JP] Japan .................... 7-111247

[51] Int. Cl.⁶ .................................................. A47J 37/04
[52] U.S. Cl. .................................. 99/421 H; 99/419
[58] Field of Search ........................ 99/419, 421 H, 99/421 HH, 421 HV

[56] References Cited

U.S. PATENT DOCUMENTS

| | | | |
|---|---|---|---|
| 2,346,628 | 4/1944 | Todd | 99/421 HH |
| 3,866,527 | 2/1975 | Katris | 99/421 H |
| 4,158,991 | 6/1979 | Nakashima | 99/421 H |
| 5,168,798 | 12/1992 | Kristofich et al. | 99/421 H |

FOREIGN PATENT DOCUMENTS 58-41848  9/1983  Japan .

*Primary Examiner*—Reginald D. Alexander
*Attorney, Agent, or Firm*—Keck, Mahin & Cate

[57] ABSTRACT

A revolving grilling apparatus grills foods, such as skewered meats and vegetables or corn, which are held parallel on a plurality of cartridges while revolving over a range. Each of the holding cartridges is placed upon one of the stations of the main body of this apparatus. The revolving members of each cartridge engaged with the food to be grilled simultaneously revolve, by being driven by a power-transmitting mechanism in the main body of the apparatus, when each of the holding cartridges is installed on each of the stations. In grilling the skewered foods to be grilled, the base portion of each spit is inserted into the tip portion of each revolving member extruded from each cartridge. In grilling corn, each ear is grilled while revolving on a pair of revolving rollers installed in the tip of each revolving member.

20 Claims, 8 Drawing Sheets

FIG. I
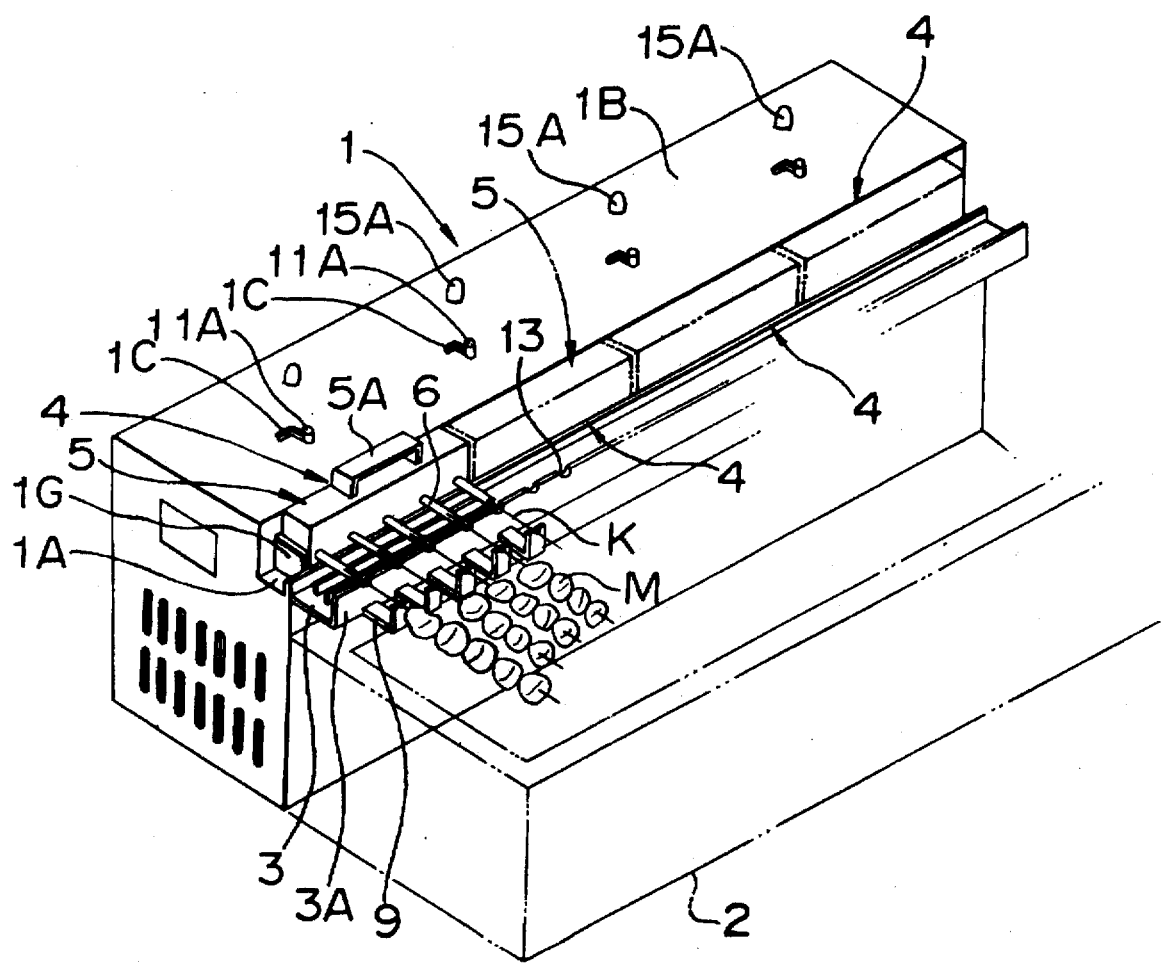

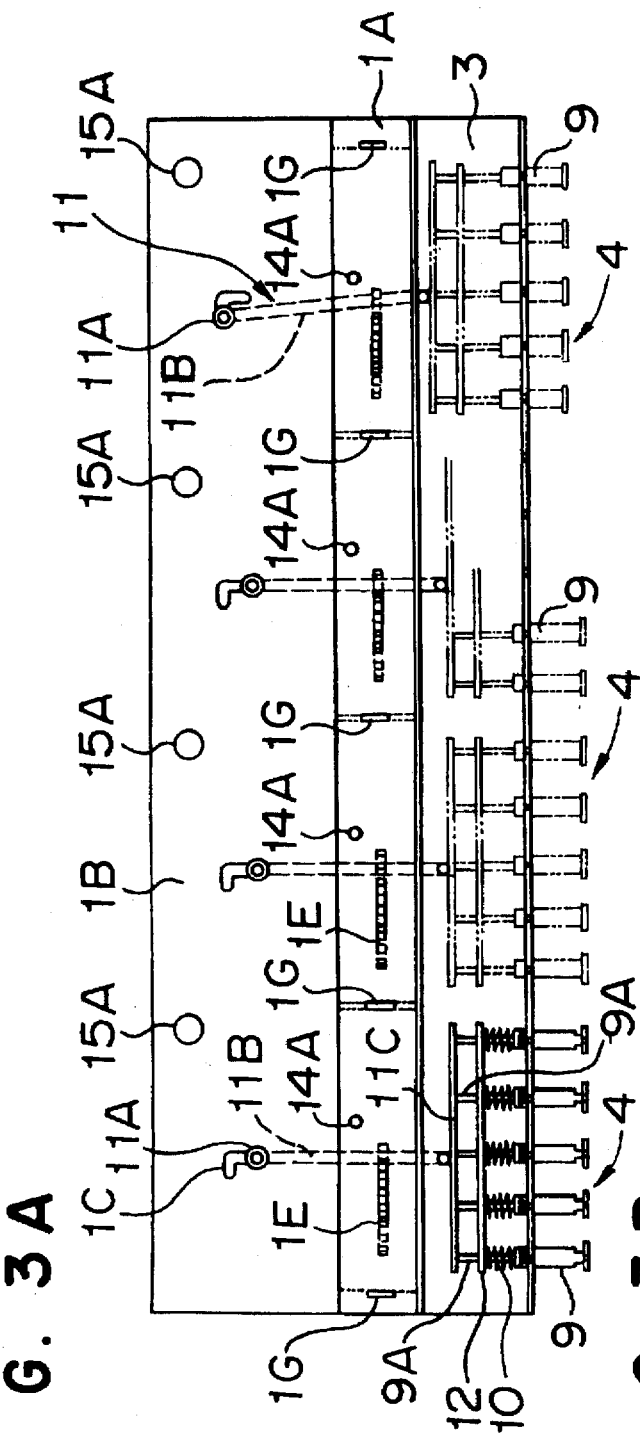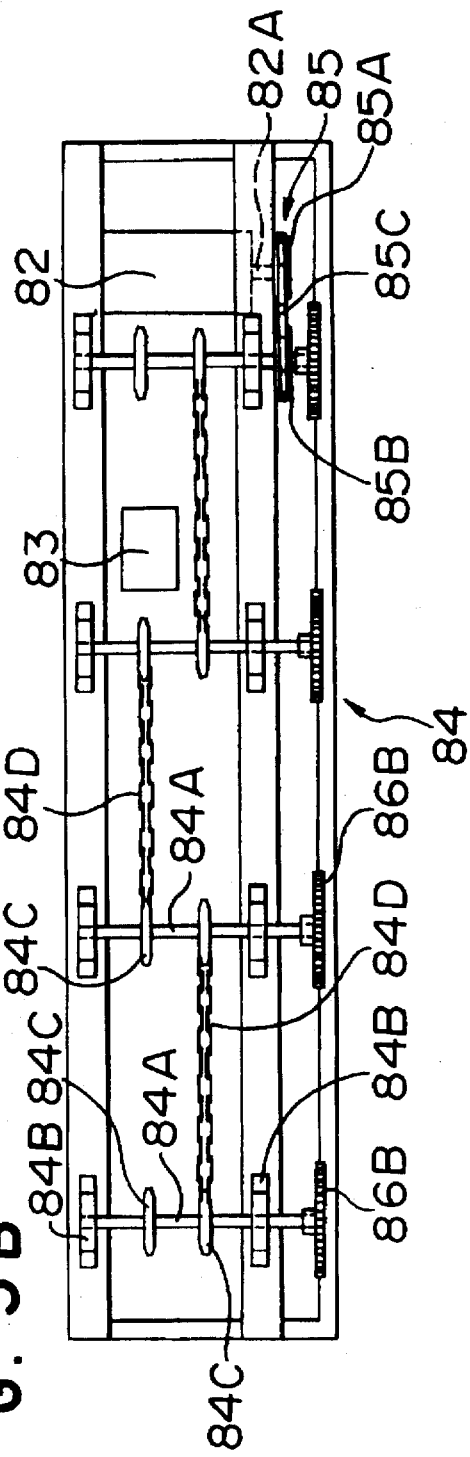

REVOLVING SPIT-GRILLING APPARATUS

BACKGROUND OF THE INVENTION

The present invention relates in general to a revolving spit-grilling apparatus for making spit-grilled foods such as grilled chicken, grilled meats, grilled sausages, grilled mushrooms or the like, and grilled corn at a shop front.

So called "spit-grilled foods", made by inserting slices of chicken, mutton, liver, sausage and the like on a bamboo stick alone or together with vegetables such as peppers, onions or the like mixed between them, adding sauce and then grilling over an open fire, are presented at food stands and stalls in many countries including Japan, and are a widely popular food having a smoke-grilled flavor and distinctive aroma. Spit-grilled foods are also popular as take-home items.

Usually when grilling spit-grilled foods such as chicken at the shop front, the food is inserted onto the bamboo stick in advance of cooking, then the stick is placed on a range such as a charcoal fire and grilled over an open fire after being dipped in miscellaneous sauces. In the case of grilled corn, a grilling stick is not used, and the entire process is performed by hand. It is necessary to carefully turn the grilling sticks or ears of corn to prevent uneven grilling, which is both cumbersome and often results in burns to the hand while turning.

As shown in the publication of examined Japanese Patent Publication Number S58-41848, a spit-grilling apparatus is introduced which comprises a base member provided along the edge of a spit-grilling range for holding a plurality of sticks, a plurality of revolvable members each having a chuck detachably chucking the base end of each of grilling spits installed on the base member, and power-transmitting means including gears and chains for driving each of the revolvable members, wherein the grilling spits on which raw ingredients to be grilled are inserted, are hung above the range while both ends of each spit are supported between the base member, and each grilling spit is turned from side by side by driving a handle connected to a power-transmitting device by hand.

In the above revolving grilling apparatus, as it is possible to turn a plurality of grilling spits arranged above the range from side to side, the foods to be grilled inserted on the spits are uniformly grilled from both surfaces thereof, but an undesirable drawback is that a root portion and an exposed tip portion of the grilling spit are scorched or burnt by heat from the heat source in the range.

With respect to grilled foods which cannot be skewered, like corn, at present a revolving grilling apparatus is not known.

The present invention is developed in consideration of the above, and its object is to provide a revolving grilling apparatus enabling grilled foods to be easily produced, and to improve the quality Of spit-grilled items by moderately and uniformly grilling, without scorching the exposed portions of grilling sticks made of bamboo and the like, and enabling food grilled without sticks to be automatically revolvable.

Another object of the present invention is to provide a revolving grilling apparatus enabling one operator to efficiently grill a plurality of foods.

A further object of the present invention is to provide a revolving grilling apparatus enabling even an inexperienced operator to efficiently grill food of a quality equivalent to the quality of food grilled by an experienced cook.

Another object of the present invention is to provide a revolving grilling apparatus able to be used for a long time in spite of cooking heat or discharged fat.

BRIEF DESCRIPTION OF THE INVENTION

The revolving grilling apparatus according to the present invention is a revolving grilling apparatus grilling foods over a heat source (such as a heat range) by revolving grilling sticks onto which have been inserted ingredients to be grilled such as meat to be spit-grilled or corn to be grilled without insertion on a spit, and each rod of revolving rollers, and comprised with a main body, and one or a plurality of rod holding-cartridges. In the main body, a base portion divided into one or more stations along the heat source, and a first power-transmitting mechanism are provided therein, and in each of the cartridges, the second power-transmitting device connecting each of a plurality of rods to each other and driving them around their axes thereof. This revolving grilling apparatus is characterized in that a plurality of revolving rods begins simultaneously to start by engaging the first power-transmitting mechanism with the second power-transmitting mechanism provided in each cartridge, when any of the rod-holding cartridges is mounted on respective stations of the base portion.

If the rods are grilling spits, each grilling spit is detachably chucked by each rotating member of each rod-holding cartridge driven by the second power-transmitting device. Each of the exploded portions of the spits having no food to be grilled, placed near the rotating member, is protected from the heat source by a heat preventive member for preventing scorching thereof.

The heat preventing member is provided to every rotating member, and is movable between an active position and a sheltering position. In the active position, one end of the heat preventing member will contact with the food to be grilled by a biasing device provided on every heat preventing member.

There is provided one sheltering device in every station, and all the heat preventing members belonging to one station are simultaneously and reciprocally movable between the active position and the sheltering position.

As means for engaging the first transmitting mechanism of the main body to each of the second transmitting devices of the rod-holding cartridges, one gear provided at every station will engage with another gear provided at every cartridge by installing any of the cartridges on the main body. All of the rotating shafts connected to the above gear of the cartridges through a plurality of synchronous belts and synchronous pulleys are able to rotate simultaneously, making it possible to evenly grill the cylindrical foods to be grilled.

By applying any intermittent revolving mechanism against the second power-transmitting mechanism for transforming the constant speed motion of the first power transmitting mechanism to the intermittent revolution of the revolving rod of the cartridge in every half revolution, or by applying a partially toothed gear in the first power-transmitting device, it becomes possible to evenly grill both sides of flat-shaped foods such as mushrooms, rice crackers, etc.

When grilling corn, which cannot be inserted on a spit, it is possible to grill the corn by placing it on a plurality of parallely displaced rods and revolving the rods while revolving itself on the revolving rods.

As the revolving speed of the grilling rod shall be changed slightly by the type of food to be grilled, it is regulated by a revolving speed controller provided in the first power-transmitting mechanism.

As the second power transmitting mechanism is apt to be soiled by fat or sauces from the grilled foods, and becomes impossible to rotate smoothly, it is preferable to adopt synchronous pulleys and corresponding synchronous belts.

In applying this apparatus to business use, as various kinds of foods are grilled at every station, the operator becomes busy, so to assist the operator, timers setting the grilling time and informing the operator when the food is finished, are provided at every station.

As the timers are installed at every station it is possible to parallely grill many kinds of foods, by placing foods together according to the required grilling time for every cartridge.

A revolving grilling apparatus having only one station, namely an apparatus which is able to house only one rod-holding cartridge, is favorable for home use.

BRIEF DESCRIPTION OF THE DRAWINGS

FIG. 1 to FIG. 5 show the first embodiment of the present invention.

FIG. 1 is a perspective view showing the revolving grilling apparatus arranged together with the range.

FIG. 2A shows the front view, FIG. 2B shows a plan view having no top cover plate, and FIG. 2C is a sectional view sectioned by the 2C—2C line showing the essential parts of FIG. 2B.

FIGS. 3A to 3D show the details of the revolving grilling apparatus shown in FIG. 1, FIG. 3A is a plan view, FIG. 3B is a sectional view sectioned by the 3B—3B line of FIG. 3C, FIG. 3C is a side view showing the advance and retreat device of a heat-preventing member, and FIG. 3D is an enlarged side view showing the detail of the heat-preventing member.

FIG. 4 is a front view showing the engagement of the power-transmitting device.

FIG. 5 is a block diagram showing the relation between timers and information means.

DETAILED DESCRIPTION OF THE INVENTION

Figure 2A:
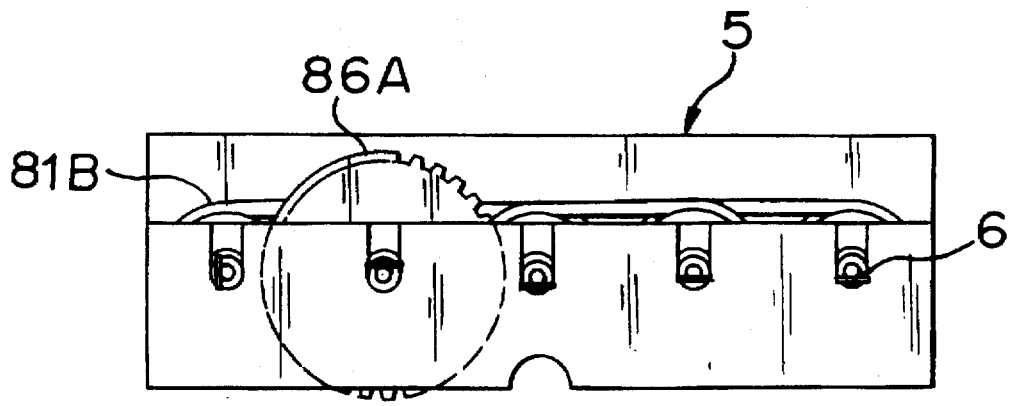
FIGS. 2A to 2C show the detail of the rod-holding cartridge of the revolving grilling apparatus shown in FIG. 1.

A plurality of embodiments according to the present invention is described in detail with reference to the drawings as follows.

THE FIRST EMBODIMENT

FIGS. 1 through 5 show the first embodiment of the revolving grilling apparatus according to the present invention. In these figures, on the front side of the main body 1 of this revolving grilling apparatus, a spit-holding base portion 1A is provided along a range (a heat source) 2, and for preventing heat discharged from the range against the miscellaneous members installed on the base ends of the spits K an eave-like fixed plate 3 is attached to the front side of the main body 1.

The base portion 1A is divided into a plurality of stations 4 (in this embodiment, divided into 4 stations) by a plurality of positioning plates 1G shown in FIG. 3A, and in each station 4, each box-like rod-holding cartridge 5 is detachably installed. Each cartridge 5 has a handle 5A on the top plate thereof, and a plurality of revolving members 6 having respectively a chuck detachably holding the end portion of grilling spit and arranged parallel along the longitudinal direction thereof.

Figure 2B:
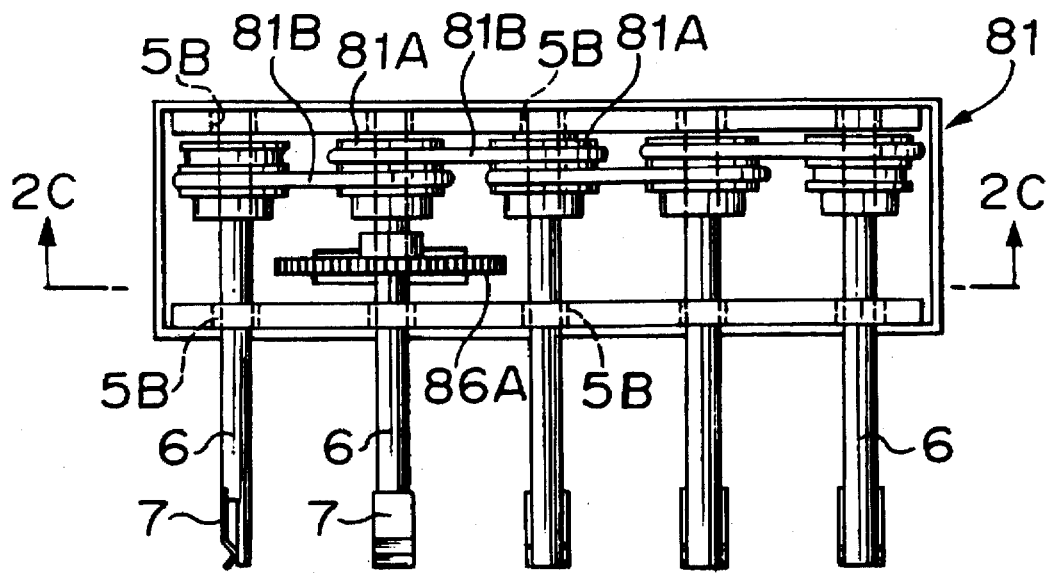

The revolving member 6 is a revolving shaft supported by the bearings 5B in the cartridge 5 as shown in FIG. 2B, and each tip portion thereof is protruded towards the front from the cartridge 5 and positioned above the fixed plate 3, when the cartridge 5 is installed on the station 4. On the tip of each revolving member, an insertion groove 6A having a U-shaped section for receiving the base portion of the grilling spit K is provided, and on the open end of the insertion groove 6A, a plate spring 7 biasing the base portion of the grilling spit inserted into the groove 6A, is attached for working as a chuck holding the grilling spit.

The revolving grilling apparatus is provided with driving means rotating the rotating members 6 with the regulated low speed. This driving means is separately provided in the main body 1 and each rod-holding cartridge 5 as described hereafter. Namely, as shown in FIGS. 2A, 2B and 2C, in each cartridge 5, a second power transmitting mechanism 81 is installed, and in the main body 1, as shown in FIG. 3B, for supplying power to the second power-transmitting mechanism 81 of each cartridge 5, a driving motor 82, a revolving speed controller 83 and a first power transmitting mechanism 84 transmitting the motor power to each station 4 are provided.

Figure 2C:
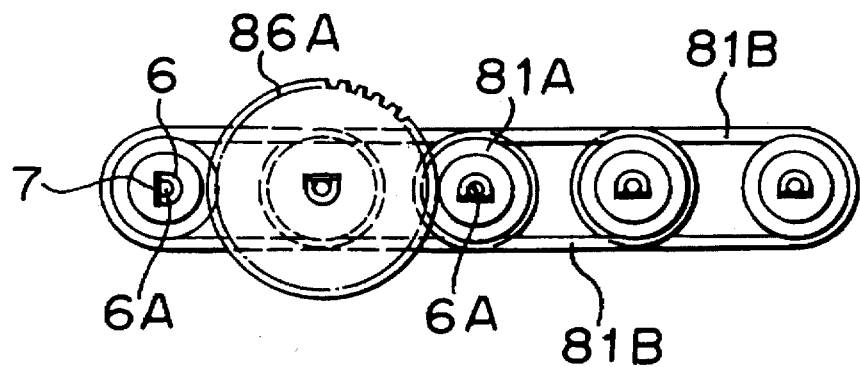

In this first embodiment, as shown in FIGS. 2B and 2C, as the second power transmitting mechanism 81, 5 pulleys, 81A having respectively 2 pulley grooves are provided in each cartridge 5, and mounted on the shaft portion of each of revolving members 6, and further each of the endless belts 81B is wound around each of the pulleys 81A for revolving each of the revolving members 6.

Each revolving member 6 is revolvably supported by two bearings 5B and 5B as shown in FIG. 2B, and smoothly revolves while bearing the weight of the grilling spit K and food to be grilled, by receiving revolving power from the mechanism 81.

For revolving all of the revolving members 6 of the stations 4 at a uniform speed, there are provided power transmitting shafts 84A supported by a pair of bearings 84B, and a sprocket wheel 84C is mounted on each power-transmitting shaft 84A. By winding each endless chain 84D around them, equal driving force is transmitted to each power-transmitting shaft 84A corresponding to each station 4, as the first power-transmitting mechanism.

As shown in FIG. 3B, power from the driving motor 82 to the first power transmission mechanism 84 is transmitted by the chain driving system 84E comprising a Sprocket wheel 85A mounted on the output shaft 82A, a sprocket wheel 85B mounted on the far right transmitting shaft 84A and an endless chain 85C wound over the sprocket wheels 85A and 85B.

In order to control the revolution speed of the driving motor, an AC motor as the driving motor 82 and a hand-operable frequency modulator as the revolution speed controller 83 are provided. In each station 4, engaging means are provided for transmitting the driving power to the second transmitting mechanism 81 of each cartridge 5 from the first transmitting mechanism 84 of the main body 1, and as shown in FIG. 4, each of the engaging means is comprised with a driving gear 86B mounted on the corresponding shaft 84A of the first transmitting mechanism 84, and a driven gear 86A mounted on one of the corresponding revolving members 6 in the second power transmitting mechanism 81 of the cartridge. As shown in FIG. 3A, each station 4 is provided with a slit 1E for engaging the driving gear 86B to the driven gear 86A on the predetermined position of the top plate of the base portion 1A. Accordingly, when any cartridge 5 is placed on any station 4, the driven gear 86A engages to the driving gear 86B to revolve the revolving members 6 of the cartridge 5.

As shown in FIG. 3A, on the base portion 1A, a plurality of positioning devices 1G is provided in order to fix the position of the cartridge 5 to be installed thereon, permitting secure engagement of the driving gear 86B with the driven gear 86A, and restraining any shifting motion of the set cartridge 5 due to the torque generated by the driven gear 86A. In this embodiment, each positioning device 1G is comprised with an upwardly projected plate from the base portion 1A, so as to hold each cartridge 5 on both sides.

Figure 3C:
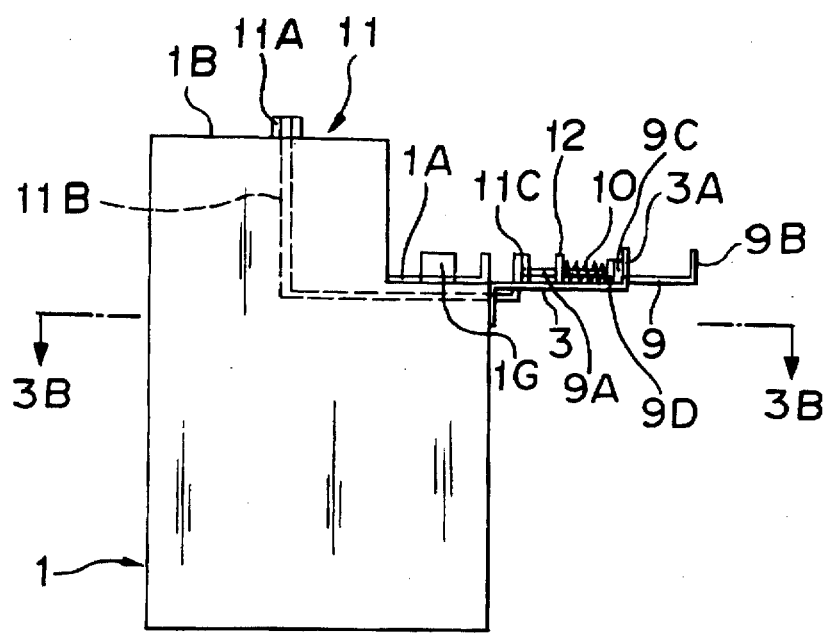
Figure 4:
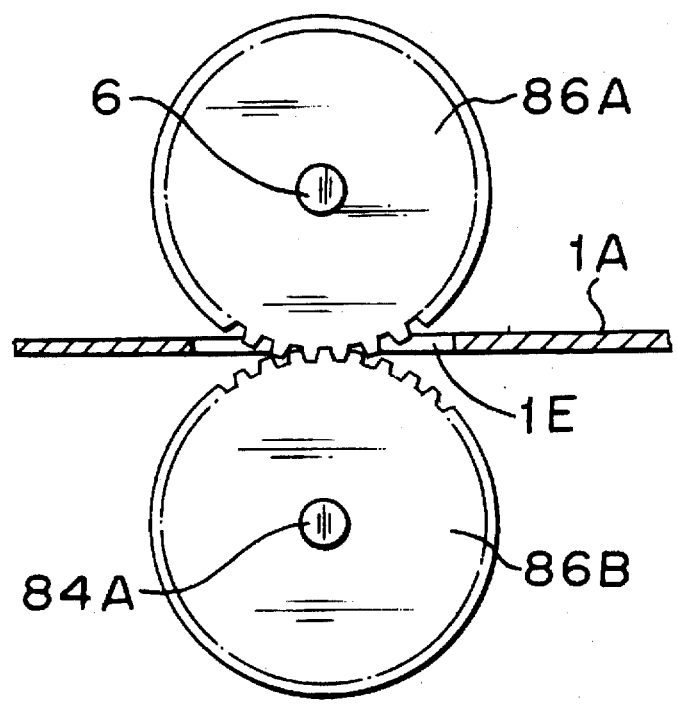

As shown in FIG. 3C, in each station 4, a plurality of retractable heat-preventing members 9 is provided under the extended area of each revolving member 6. Each of these members 9 is movable between an advanced operational position and a retracted position. In the advanced position, as each of these members 9 is placed between the exploded portion of the grilling spit K and the heat source of the range 2, contacting the foods M to be grilled, it becomes possible to prevent the exploded portion of the spit K from scorching. In the retracted position, as each of these members 9 remove from the foods M to be grilled, it becomes possible to dismantle each rod-holding cartridge 5 from each station 4.

Figure 3D:
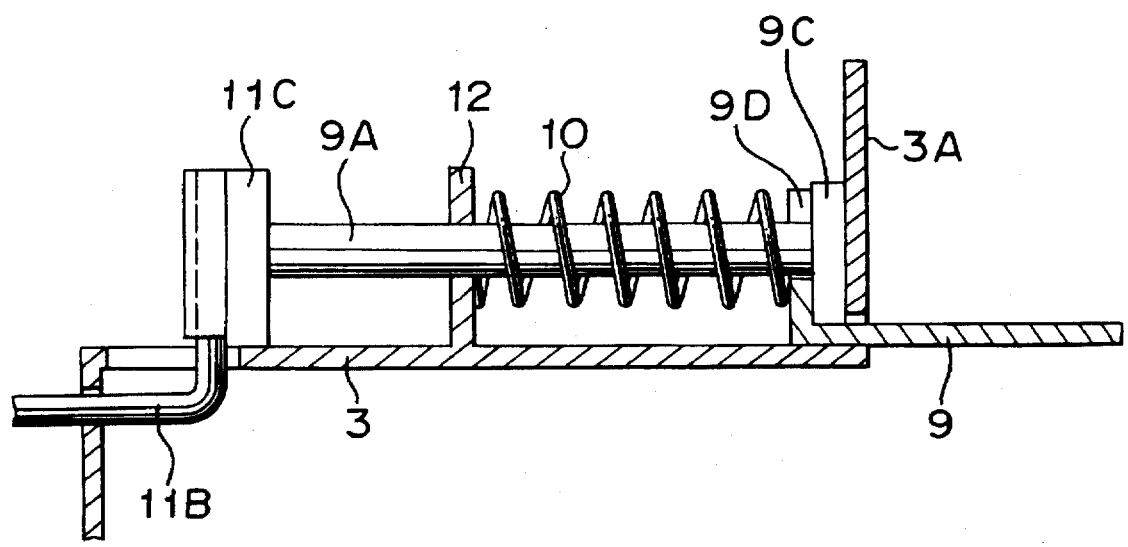

In each station 4, each retracting device 11 is provided for retracting each heat-preventing member 9 from the advanced position to the retracted position. The detailed construction of the retracting device 11 retracting the heat-preventing member is described as follows. As shown in FIGS. 3C and 3D, each spring-receiving plate 12 is fixed on the fixed plate 3. Each rod 9A is fixed to a connecting plate 11C at the rear end thereof, and on the tip thereof a head portion 9C is provided and its middle portion slidably moves through the spring receiving plate 12, and is front wisely biased by a biasing means 10 such as a compression coil spring. Each heat-preventing member 9 includes a front portion 9B contactable to foods M to be grilled, a rear portion 9D slidably inserted in the inside of the head portion 9C of the rod 9A, and a middle portion along the fixed plate 9 connected to both the front portion 9B and the rear portion 9D. The compressed coil spring 10 is inserted on the rod 9A between the rear portion 9D of heat-preventing member 9 and the spring-receiving plate 12 as the biasing device. The retracting device 11 includes an L-shaped operating rod 11B having a grip 11A on the upper thereof and the connecting plate 11C extending transversely along the fixed plate 3. Further, the tip portion of the operating rod 11B penetrates under each station 4, and extrudes on the main body 1, and the tip portion is connected pivotally to the connecting plate 11C. An under portion of the grip 11A is placed through an L-shaped guide groove 1C shaped in the top plate of the main body 1 as shown in FIG. 3A.

When each rod-holding cartridge 5 is not installed on each station 4, or when detaching each rod-holding cartridge 5, each heat-preventing member 9 is placed in the retracted position by engaging the operating rod 11B to the hooked portion of the guide groove 1C by opposing against the biasing device 10.

When each rod-holding cartridge 5 is installed on each station 4, the engaging of the operating rod 11B is released the operating rod 11B is advanced by the elastic force of the biasing device 10, and each heat-preventing member 9 is positioned in an advanced operating position. In this advancement, if the member 9 is pushed rearwardly by contacting the front portion 9B of the member 9 against food to be grilled, it becomes possible to maintain the heat-preventing member 9 in contact with foods M to be grilled by retracting the biasing spring. Further, even if each position of foods M on each spit from the rear end of the spit is different from each other, the above contacting condition is always maintained.

On the front end portion of the fixed plate 3A an upwardly extruded portion 3A is shaped, and on this portion 3A each U-shaped groove 13 is provided in accordance with each revolving member 6 for supporting each of the base portions of grilled sticks while bearing the load of the grilled stick with a cantilever.

Figure 5:
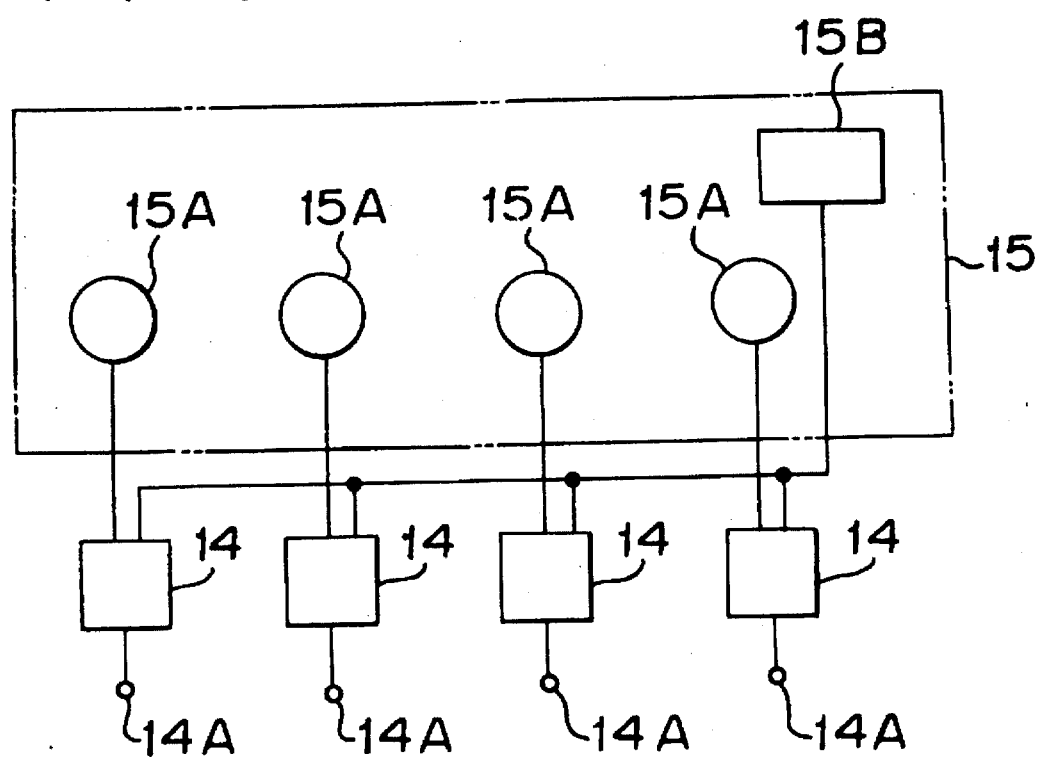

As shown in FIG. 5, in order to secure the preferred grilled condition adequate to each grilling food, in the main body 1, a timer 14 and an informing equipment 15A such as an indicating lamp and a buzzer 15B (which is single and common for all stations) are provided for each station 4. Each timer 14 is able to set a required grilling time, and to start counting time when the cartridge 5 is installed on the station 4, and if the cartridge 5 is removed before time is up, the switch 14A turns off to hold the timer. The informing equipment 15A is operated so as to inform the grilling time of the food to be grilled, namely after time is up.

The informing lamp (visual information equipment) 15A is installed in every station 4, namely in this embodiment, four lamps are installed, making it possible for the operator to easily confirm which station has finished grilling.

As the revolving grilling apparatus according to the present invention is constructed as described above, at the shop front, raw skewered foods are prepared and stored in advance, and as occasion demands, the base portion of grilling spit K prepared in advance is inserted in every revolving member 6 of each cartridge 5, and such cartridge 5 is placed on the vacant station 4, after soaking food in sauce, then the driven gear 86A engages to the driving gear 86B, and as the driving force of the driving motor 82 is transmitted to the power-transmitting mechanism 81 of the cartridge 5, each revolving member 6 is forced to rotate, the skewered foods rotating over the range 2. Accordingly, there is no danger of injury by burning when inserting the spit into the revolving member.

After the cartridge 5 is installed on the vacant station 4, the operating rod 11B is released from the hook portion of the L-shaped guide groove 1C by manipulating the grip 11A, then the operating rod 11B is advanced to the operating position, so as to shift the heat-preventing plates 9 in the Working position by applying the biasing devices 10. In this case, even if the inserted position of the food to be grilled against the grilling spit K is irregular, as the tip of the heat-preventing plate 9 contacts with the grilling food M, the scorching of the exploded portion of the spit is prevented by the heat-preventing plate 9. For cartridge dismantling from the station 4, the heat-preventing plate 9 is in advance retracted into the retracted position and removed from the grilled food M, and the dismantling of the cartridge 4 is smoothly performed without injuring the grilled food.

As the revolving speed of the revolving member 6 is freely controllable by the revolving speed controller 83, it is possible to revolve at the most adequate revolving speed, for example, by a quarter revolution per second, and to grill uniformly.

After the preset time, namely after the proper grilling time elapses, and the cartridge 5 has completed its grilling, the timer 14 indicates that time is up, and the informing equipment 15A informs the operator. It thus becomes possible to offer good quality skewered foods to still waiting customers.

In the above embodiment, the grilling apparatus has 4 cartridges, but it is possible to provide only 1 cartridge for home use, and further to provide a much larger apparatus having more than 4 cartridges according to the size of the range, for a large-scale shop.

The revolving speed of the revolving members of one station 4 is in general determined at the same speed for the same kind of skewered food, but it becomes possible to grill more than 2 kinds of skewered foods with different revolving speeds, for example with one revolving speed for the 2 revolving left-side members and with another revolving speed for the 3 revolving right-side members, by changing the transmitting power ratio of each revolving member in any cartridge 5.

The visual information equipment is not limited only to a lamp, and it is preferable to use a self-lighting device such as a light-emitting-diode or the conspicuous turn on and off equipment. It is further preferred to apply another device generating visual alarm.

The heat source employed in this embodiment can be gas, electric heater or wood/charcoal in the same manner. The grilling apparatus is so constructed as to grill the skewered foods over the range by detachably mounting the rod-holding cartridge 5 having a plurality of grilling spits on which have been inserted the foods to be grilled, on the grilling apparatus, and it is possible to insert the skewered foods into the rod-holding cartridge 5 after sauce is applied to the skewered foods at a cool place apart from the hot range and then the cartridge 5 is placed on the grilling main body, and it is easy to dismantle the cartridge 5 for adding the sauce in mid-grilling.

When the skewered foods are grilled, the rod-holding cartridge is dismantled from the main body of the grilling apparatus, and the grilled foods are removed from the cartridge at the other cool position. Accordingly, the working conditions for the operator are outstandingly superior.

By adopting the positioning device for placing the rod-holding cartridge 4 on the base portion of the main body of the grilling apparatus so as not to move, it becomes possible to smoothly engage the first power-transmitting mechanism to the second power-transmitting mechanism and to evenly grill the skewered foods by securely revolving the revolving members, and to add further sauce on the skewered foods after dismantling, and it becomes possible to easily install the skewered foods into the rod-holding cartridge.

As the revolving rod is set to revolve at a low speed adequate to the skewered foods, the skewered foods are grilled finely without dripping the sauce, fat or meat, or dispersing the by the centrifugal force.

Further, by the heat-preventing plate protecting the base portion of the grilling spit from the heat of the range, the grilled foods are attractive and their value increased.

As the skewered foods are grilled while being supported in a cantilevered condition without supporting the tip portion of the skewered foods by the supporting device and the like, it becomes possible to easily work, and the tip of the spit is also prevented from scorching as the tip of the spit is not required to extrude from the skewered foods.

By providing a heat-preventing plate for each revolving member, and by letting the heat-preventing plate move independently, it becomes possible to place the heat-preventing plate following the revolving member-to-food gap deviation and to protect the exposed portion of the grilling spit. Accordingly, it becomes unnecessary to hold the distance between the base portion of the grilling spit and the food to be grilled, and it becomes possible to use even the skewered foods by hand operation having scattered dimension between the tip portion of the spit and the foremost placed food to be grilled. Further, the timer and information equipment in every cartridge makes it possible to finish grilling without constantly watching the grilling. The operator is also able to move away from the hot range while grilling is performed.

By adopting visual information equipment such as a lamp or the like as the informing device, it becomes possible to confirm which cartridge has completed grilling when a plurality of cartridges is parallely used.

THE SECOND EMBODIMENT

Figure 6:
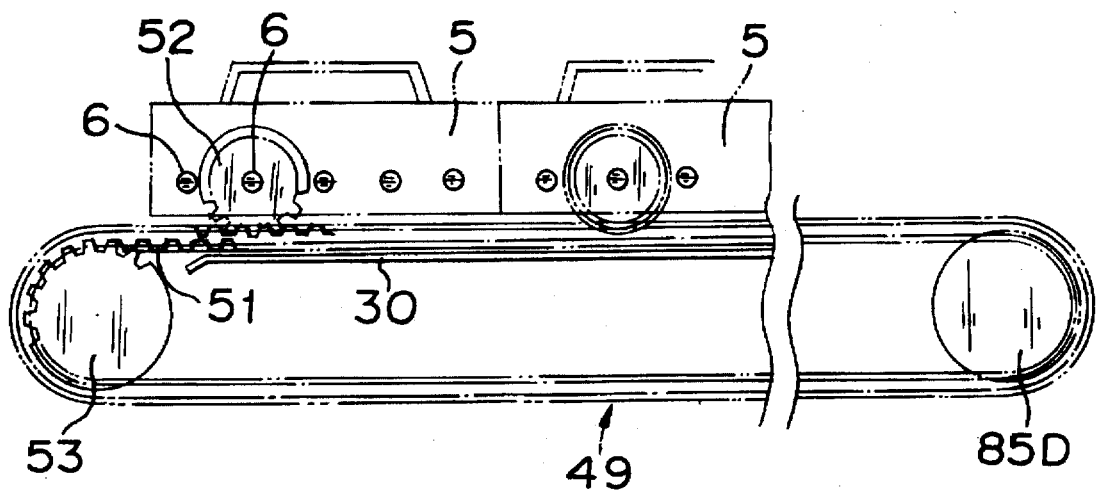
FIG. 6 is a front view showing the second embodiment of the power-transmitting mechanism of the revolving grilling apparatus.

Another embodiment of the power-transmitting mechanism of the revolving grilling apparatus according to the present invention is shown in FIG. 6. In this drawing, numeral 51 is a double-faced synchronous belt which is wound around a synchronous pulley 53 and another synchronous pulley 85D, and the synchronous belt 51 and a pair of synchronous pulleys 53 and 85D compose the first power transmitting mechanism 49, and this mechanism is driven by the synchronous pulley 85D mounted on the motor output shaft. The upper running surface of the synchronous belt 51 is placed along the upper surface of each station 4, engaging with each synchronous pulley 52 of the second power-transmitting mechanism in each cartridge 5 placed on each station 4, so that the revolving members 6 of the cartridge 5 simultaneously rotate. Numeral 30 is a guide plate for preventing disengagement of the synchronous belt 51 from each synchronous pulley 52. Other portions, excepting the portions shown in FIG. 6, are identical to those of the first embodiment. By applying these synchronous belts and synchronous pulleys instead of the chain mechanism and gears adopted in the first embodiment, it becomes less expensive without slipping.

THE THIRD EMBODIMENT

Figure 7:
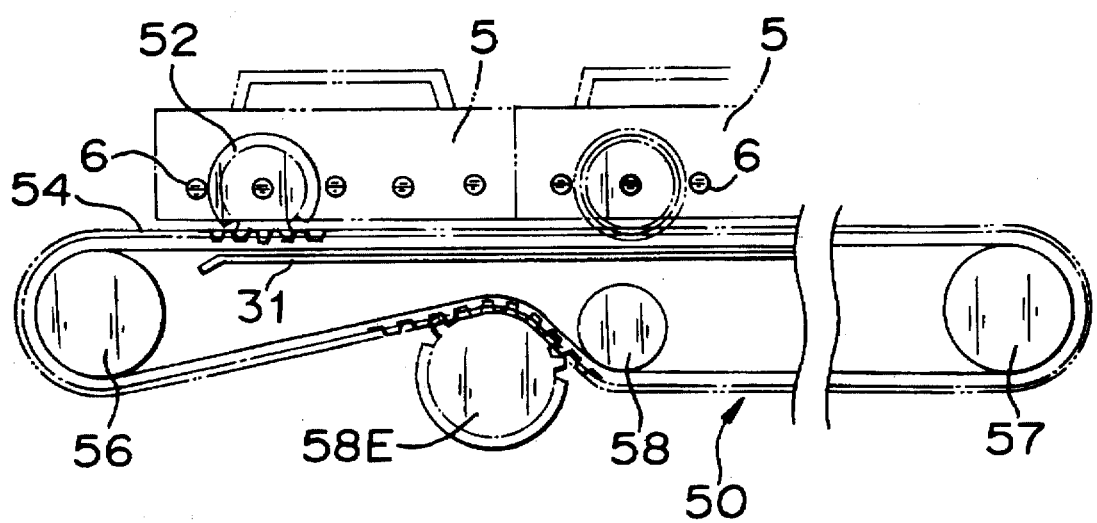
FIG. 7 is a front view showing the third embodiment of the power-transmitting mechanism of the revolving grilling apparatus.

Another embodiment of the power-transmitting mechanism of the revolving grilling machine according to the present invention is shown in FIG. 7. In this Figure, numeral 54 is an outer-faced synchronous belt which is wound around idling pulleys 56, 57, 58, and is pressed in by a synchronous pulley 58E anointed on the motor shaft. The belt and pulleys compose the first power-transmitting mechanism 50. The upper running surface of the synchronous belt 54 is placed on the same plane along the upper surface of each of the stations, engaging with each synchronous pulley 52 of the second power transmitting mechanism in each cartridge 5 placed on each station 4, so that the revolving members 6 of the cartridge 5 simultaneously rotate. Numeral 31 is a guide plate for preventing disengagement of the synchronous pulley 54 from each synchronous pulley 52. Other portions excepting the portions shown in FIG. 7 are identical to those of the first embodiment.

By applying this third embodiment it also becomes less expensive without slipping.

THE FOURTH EMBODIMENT

Figure 8:
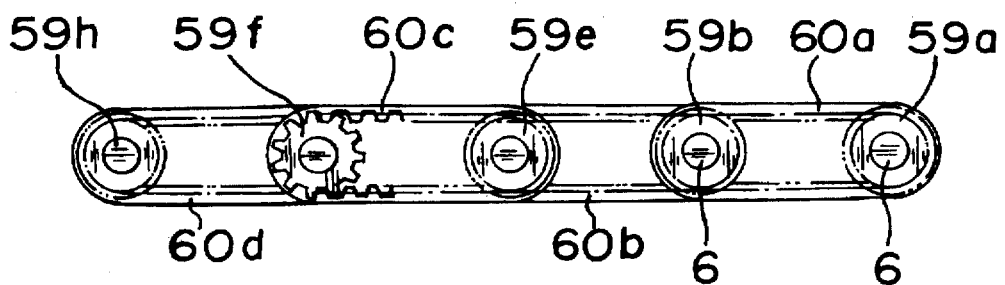
FIG. 8 is a front view showing another embodiment of the second power-transmitting mechanism of the revolving grilling apparatus.

Another embodiment of the second power-transmitting mechanism of the revolving grilling apparatus according to the present invention is shown in FIG. 8. In this embodiment, instead of the pulley 81A, endless belt 81B in each cartridge 5, a plurality of synchronous pulleys 59 (59a . . . 59h) and a plurality of synchronous belts 60 (60a . . . 60d) are adopted, and the revolving members 6 simultaneously rotate. The cartridges are apt to be intruded by fat, broth and sauces that drip from the grilling foods which causes slippages in the second power-transmitting mechanism. This embodiment has superior protection from said drips.

For the engaging means between the first power-transmitting mechanism 84 and the second power-transmitting mechanism 81, it is possible to adopt the driving gear 86B and the driven gear 86A of the first embodiment, or to adopt the synchronous belt 51 or 54 and the synchronous pulleys 52 shown in the second and third embodiments.

THE FIFTH EMBODIMENT

Figure 9:
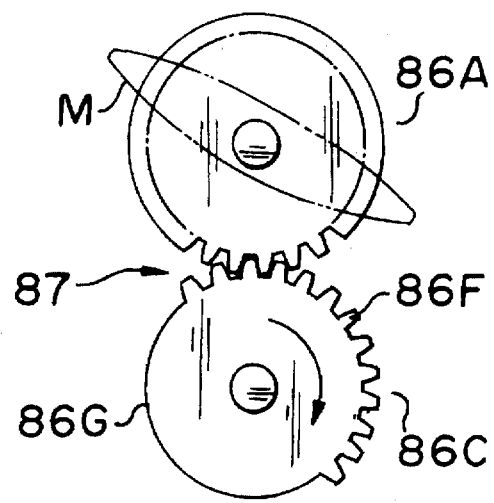
FIG. 9 is the front view showing an embodiment of the intermittent revolving mechanism transmitting the power from the first transmitting mechanism to the second transmitting mechanism.

The fifth embodiment having an intermittent driving mechanism is shown in FIG. 9. This embodiment is designed for grilling flat-shaped foods such as shiitake (Japanese mushrooms), rice crackers or rice cakes, and has an intermittent driving mechanism for grilling these foods in such a manner in which an interval with no rotation, during which a flat surface of the foods face the range, comes after a turn-over rotation. In FIG. 9, the rod-holding cartridge is identical with that provided in the first or fourth embodiment having the driven gear 86A, and a partially toothed gear 86C is used as the drive gear of the first power-transmitting mechanism. This partially toothed gear has teeth 86F only on the half circumference and the rest portion is shaped as a circle 86G having a diameter less than the gear root diameter. Accordingly, while the partially toothed gear 86C engages with the driven gear 86A, the latter gear revolves with constant speed, but when the toothless portion 86G of the former gear approaches the latter gear, the latter gear 86A stops until the tooth portion of the former gear 86C contacts the latter. Accordingly, the driven gear 86A revolves as much as 180°, and rests as much as the next 180°.

It is also possible to adopt a totally toothed synchronous pulley and a partially toothed synchronous belt instead of those, as shown in the second embodiment of a synchronous belt system.

For such flat-surfaced foods, it is preferable to adopt a rectangularly sectioned spit to prevent idle running of the food against the spit.

THE SIXTH EMBODIMENT

Figure 10:
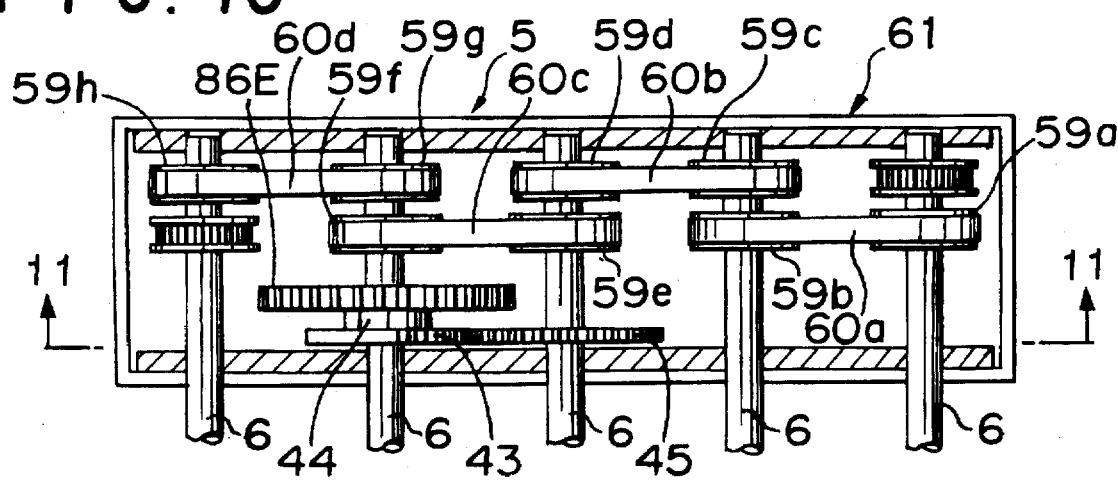
FIG. 10 is a plan view showing an embodiment in which the second power-transmitting mechanism is constructed with the intermittent revolving mechanism.
Figure 11:
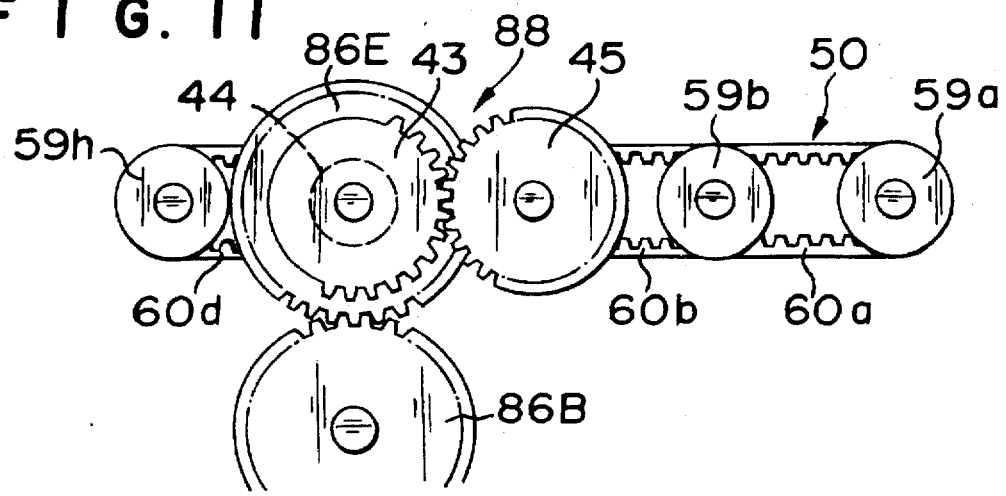
FIG. 11 shows a sectional view sectioned by the line 11—11 of FIG. 10.

The sixth embodiment shown in FIG. 10 and FIG. 11 is provided with a second power-transmitting mechanism having another intermittent revolving mechanism.

In FIGS. 10 and 11, it is the same as that of the fourth embodiment shown in FIG. 8 where the second power-transmitting mechanism 61 is provided with a plurality of synchronous pulleys 59 (59a . . . 59h), each having two pulley wheels fixed on each of revolving members 6, a plurality of endless synchronous belts 60 (60a . . . 60d) surrounding a pair of neighboring pulleys 59. A driven gear 86E engagable with the driving gear 86B in the main body 1 is fixed on a sleeve 44 which is rotatably installed on one of the driving members 6. A partially toothed intermittent driving gear 43 is fixed coaxially on the sleeve 44. This partially toothed gear 43 has a series of teeth only around a half circumference thereof, and the other half circumference thereof shaped on the external perimeter smaller less than the gear root circle and the toothed portion is to engage with the totally toothed gear 45 fixed on a neighboring revolving member 6.

Accordingly, the driven gear 86E, the sleeve 44 and the partially toothed gear 43 are driven at constant revolutional speed by being driven by the driving gear 86B. The partially toothed gear 43 drives the gear 45 every half revolution thereof, and during another half revolution thereof the gear 45 is stopped as it cannot mesh with the partially toothed gear As the intermittent revolution of the gear 45 is transmitted to every revolving member 6 through a plurality of synchronous belts and pulleys, every revolving member 6 instantaneously revolves only during each degree of 180°. In consequence, each flat surface of the skewered foods, such as mushrooms, driven by each driving member 6 is fully grilled, resting during a half revolution of the driving gear 86B and turned over during the other half revolution thereof.

THE SEVENTH EMBODIMENT

Figure 12:
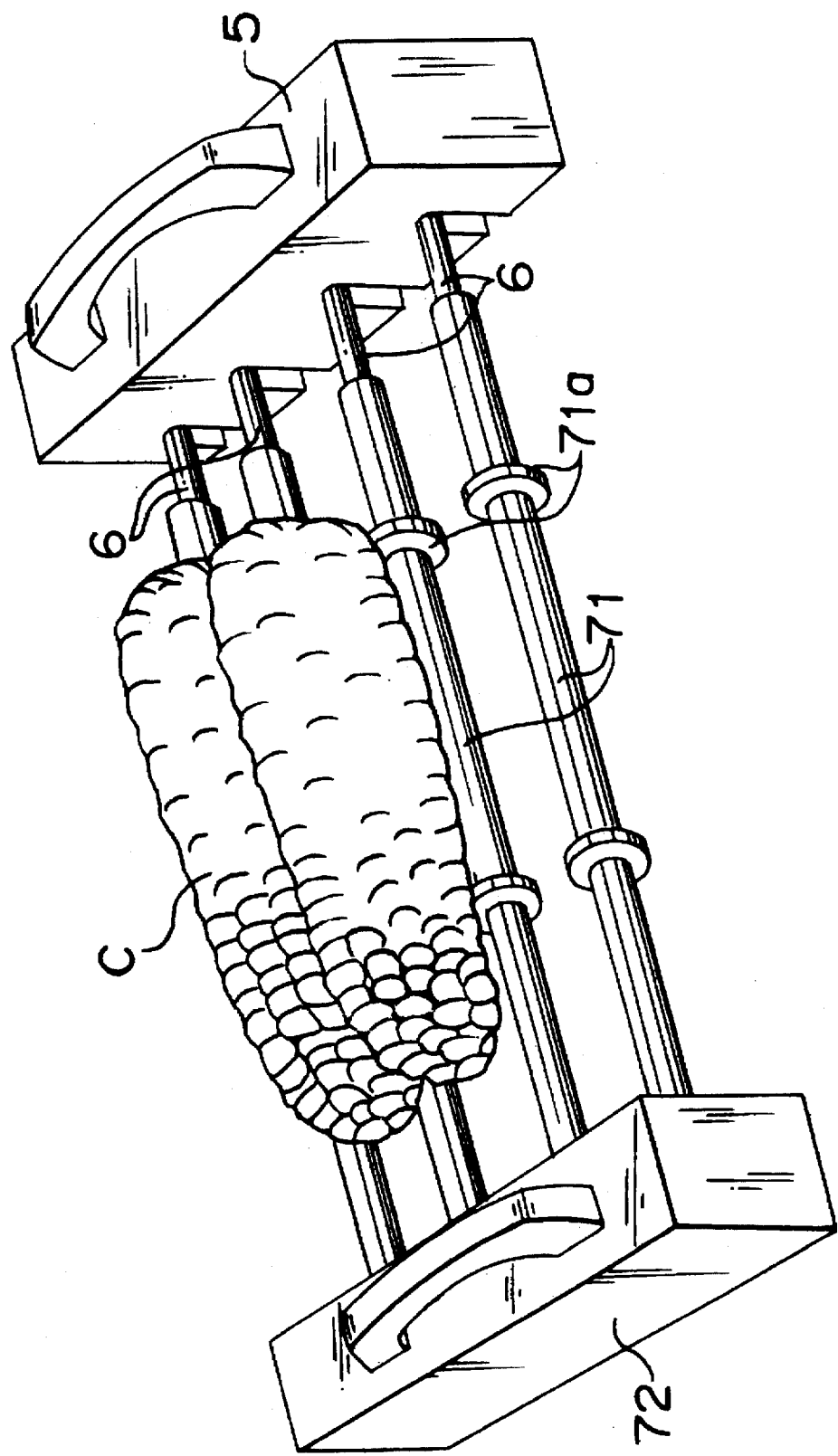
FIG. 12 is a perspective view showing the rod-holding cartridge and the supporting members of the corn for grilling corn.

FIG. 12 is a perspective view showing one rod-holding cartridge 5, one second cartridge 72 placed apart from the cartridge 5, and a plurality of rods supporting corn C to be grilled for grilling foods that are not skewered, such as shucked corn ears C. In FIG. 12, numeral 5 is the rod-holding cartridge similar to that shown in the first embodiment. A plurality of rods 71 is rotatably supported at one end by each revolving member 6 respectively and at the other end by the second rod-holding cartridge 72. The second rod-holding cartridge 72 supports the revolving rollers 71 respectively free to revolve because it has no relative power-transmitting mechanism.

By placing corn ears C on a pair of neighboring rollers 71, it becomes possible to grill it while revolving thereon. Rings 71a fixed on the roller 71 serve corn ears C better and rotation is smoother. For increasing revolving transmission, it is preferable to provide other surfaces such as knurling or nicking on the peripheral surface of the roller. In grilling ears of corn, as each roller is heated, the corn ears are finely grilled by heat transmission from the high-heated rollers.

What is claimed is:

1. A revolving grilling apparatus for grilling foods provided on a plurality of revolving rods over a heat range comprising:

a main body having a base portion installed thereon, said base portion having at least one partitioned station and a first power transmitting mechanism;

a cartridge corresponding to each station and having a plurality of revolving members for receiving said revolving rods and a second power transmitting mechanism driving said revolving members so that they revolve; and at least one engaging means for engaging said first power transmitting mechanism and said second power transmitting mechanism when said cartridge is installed on said at least one partitioned station so that said revolving members simultaneously begin to revolve.

2. A revolving grilling apparatus as claimed in claim 1, wherein each of said revolving rods is a grilling spit having a base portion inserted in each of said plurality of revolving members driven by said second power transmitting mechanism.

3. A revolving grilling apparatus as claimed in claim 2, and further comprising a heat-preventing member for location between an exposed bare portion of said grilling spit and said heat range.

4. A revolving grilling apparatus as claimed in claim 3, wherein a plurality of said heat-preventing members is installed movably between a working position and a retracted position so that the heat-preventing members correspond in number to said revolving members, and further comprising a biasing device biasing each of said heat-preventing members into said working position so that one end portion of each of said heat-preventing members contacts the foods.

5. A revolving grilling apparatus as claimed in claim 4, and further comprising a retracting device at said at least one partitioned station moving all of said heat-preventing members in said at least one station towards said retracted position at the same time.

6. A revolving grilling apparatus as claimed in claim 2, and further comprising means for converting a constant speed of revolution provided by said first power-transmitting mechanism to an intermittent revolving motion of said plurality of revolving rods.

7. A revolving grilling apparatus as claimed in claim 2, and further comprising an intermittent revolving mechanism converting constant revolving motion of said first power transmitting mechanism into intermittent revolving motion of said plurality of revolving rods.

8. A revolving grilling apparatus as claimed in claim 7, wherein said intermittent revolving mechanism is composed of a partially toothed first gear in said first power transmitting mechanism and a second gear in said second power transmitting mechanism, said first and second gears intermittently engaging through a slit defined in a top plate of said at least one partitioned station.

9. A revolving grilling apparatus as claimed in claim 1, wherein said engaging means comprises a first gear of said first power transmitting mechanism and a second gear of said second which engage each other through a slit defined in a top plate of said at least one partitioned station.

10. A revolving grilling apparatus as claimed in claim 1, wherein said engaging means comprises synchronous belts of said first power transmitting mechanism and a synchronous pulley of said second power transmitting mechanism said synchronous pulley engaging with said synchronous belts through a slit defined in a top plate of said at least one partitioned station.

11. A revolving grilling apparatus as claimed in claim 1 wherein said revolving rods include plural rollers inserted on each of said revolving members.

12. A revolving grilling apparatus as claimed in claim 1, and further comprising a plurality of positioning means at said at least one partitioned station for guiding and placing said cartridge corresponding to each station in specified positions.

13. A revolving grilling apparatus as claimed in claim 1, wherein said first power transmitting mechanism is provided with a driving motor and a revolution speed controller for controlling a speed at which said first power transmitting mechanism revolves.

14. A revolving grilling apparatus as claimed in claim 1, wherein said first power transmitting mechanism comprises a chain driving system.

15. A revolving grilling apparatus as claimed in claim 1, wherein said second power transmitting mechanism includes a synchronous pulley corresponding to each of said revolving members and a synchronous belt engaging each pulley.

16. A revolving grilling apparatus as claimed in claim 1, and further comprising a fixed plate, including an extruded portion, extending from said base portion of said main body for supporting base portions of said revolving rods.

17. A revolving grilling apparatus as claimed in claim 1, wherein said at least one station includes a timer for setting a grilling time of said foods and timer-activating equipment for causing said timer to count after said cartridge is placed on said at least one station, and further comprising information equipment acting upon receiving a time-up signal from said timer.

18. A revolving grilling apparatus as claimed in claim 17, wherein said information equipment includes visual information equipment.

19. A revolving grilling apparatus as claimed in claim 11, wherein said first power transmitting mechanism includes a chain driving system.

20. A revolving grilling apparatus as claimed in claim 12, and further comprising a fixed plate, including an extruded portion, extending from said base portion of said main body for supporting base portions of said revolving rods.

* * * * *